(12) United States Patent
Cui et al.

(10) Patent No.: US 12,147,485 B2
(45) Date of Patent: Nov. 19, 2024

(54) MANAGING SEARCH ENGINES BASED ON SEARCH PERFORM METRICS

(71) Applicant: INTUIT INC., Mountain View, CA (US)

(72) Inventors: Wendi Cui, Mountain View, CA (US); Damien J. Lopez, Mountain View, CA (US); Colin P. Ryan, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/409,980

(22) Filed: Jan. 11, 2024

(65) Prior Publication Data

US 2024/0143680 A1 May 2, 2024

Related U.S. Application Data

(63) Continuation of application No. 17/937,180, filed on Sep. 30, 2022, now Pat. No. 11,907,315.

(51) Int. Cl.
*G06F 16/00* (2019.01)
*G06F 16/9535* (2019.01)
*H04L 67/50* (2022.01)

(52) U.S. Cl.
CPC ........ *G06F 16/9535* (2019.01); *H04L 67/535* (2022.05)

(58) Field of Classification Search
CPC ........................... G06F 16/9535; H04L 67/535
See application file for complete search history.

(56) References Cited

U.S. PATENT DOCUMENTS

| | | |
|---|---|---|
| 8,392,435 B1 | 3/2013 | Yamauchi |
| 2011/0231241 A1 | 9/2011 | Kesari et al. |
| 2014/0067786 A1* | 3/2014 | Newey ................ G06F 16/9535 707/E17.108 |
| 2016/0162574 A1 | 6/2016 | Gorodilov |
| 2017/0161339 A1 | 6/2017 | Garg et al. |

* cited by examiner

*Primary Examiner* — Yicun Wu
(74) *Attorney, Agent, or Firm* — Patterson + Sheridan, LLP

(57) ABSTRACT

Certain aspects of the present disclosure provide techniques for managing a search engine based on search performance metrics. An example method generally includes dividing a set of search history data into a first subset of search history data and a second subset of search history data. The first subset of data is associated with interaction with search results, and the second subset of data is associated with non-interaction with search results. A first quality score is generated for searches in the first subset of data. A second quality score is generated for searches in the second subset of data based on different search intents identified for each temporally related group in the second subset of data. An overall quality score is generated for a search engine, and one or more actions with respect to the search engine are taken based on the overall quality score.

20 Claims, 4 Drawing Sheets

MANAGING SEARCH ENGINES BASED ON SEARCH PERFORM METRICS

CROSS-REFERENCE TO RELATED APPLICATIONS

This Application is a continuation of co-pending U.S. patent application Ser. No. 17/937,180, filed Sep. 30, 2022, the contents of which are incorporated herein by reference in their entirety.

INTRODUCTION

Aspects of the present disclosure relate to search engines used to search for content in computer systems, and more specifically to determining when a search query has returned relevant content for a user in the absence of interaction with search results for the query.

BACKGROUND

Search engines allow users of a computing system to search for data across various sources. These search engines can, for example, allow users to search for data on an intranet, or internal network in which access is restricted to members of an organization, or on the public Internet. In some cases, search engines deployed on an intranet can allow users to search for data on web servers, document management systems, and/or other data repositories in which data can be stored. Regardless of whether a search engine is deployed on an intranet or the Internet, search engines may not always deliver results that a user desires or finds usable. For example, these search results may be more or less accurate, and thus deliver or not deliver desired results to a user, based on the popularity of a search term, a similarity between the search term and other search terms, and the like.

To monitor user satisfaction with results of a search engine, various techniques can be used. In one example, a user may be presented with a survey in which feedback about whether the results delivered by a search engine in response to a search query met the user's expectations. While these surveys may provide information that can be used to determine the performance of the search engine, the amount of data gathered from these surveys may be limited due to a lack of user responsiveness to these surveys. In another example, various automated techniques can be used to monitor user interaction with search results and determine the quality of these search results based on the rank of the results with which the user interacted. These techniques, however, may be predicated on user interaction with one or more search results presented to the user. For search engines that present additional data about a search result beyond a link to a location at which the search result is located (e.g., some search engines may a preview of the location at which the search result is located or an excerpt of the search result relevant to the user's query), non-interaction with the search results generated by a search engine may not indicate whether or not the search results were relevant to the user who executed a search request.

Accordingly, techniques are needed to improve the evaluation of search engines in computer systems.

BRIEF SUMMARY

Certain embodiments provide a computer-implemented method for managing a search engine based on search performance metrics. An example method generally includes dividing a set of search history data into a first subset of search history data and a second subset of search history data. Generally, the first subset of search history data comprises search history data associated with interaction with one or more results of a first corresponding search, and the second subset of search history data comprises search history data associated with non-interaction with one or more results of a second corresponding search. A first quality score is generated for searches in the first subset of search history data. A second quality score is generated for searches in the second subset of search history data based on different search intents identified for each temporally related group in the second subset of search history data. An overall quality score is generated for a search engine based on the first quality score, the second quality score, and a total number of search events in the set of search history data, and one or more actions with respect to the search engine are taken based on the overall quality score.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
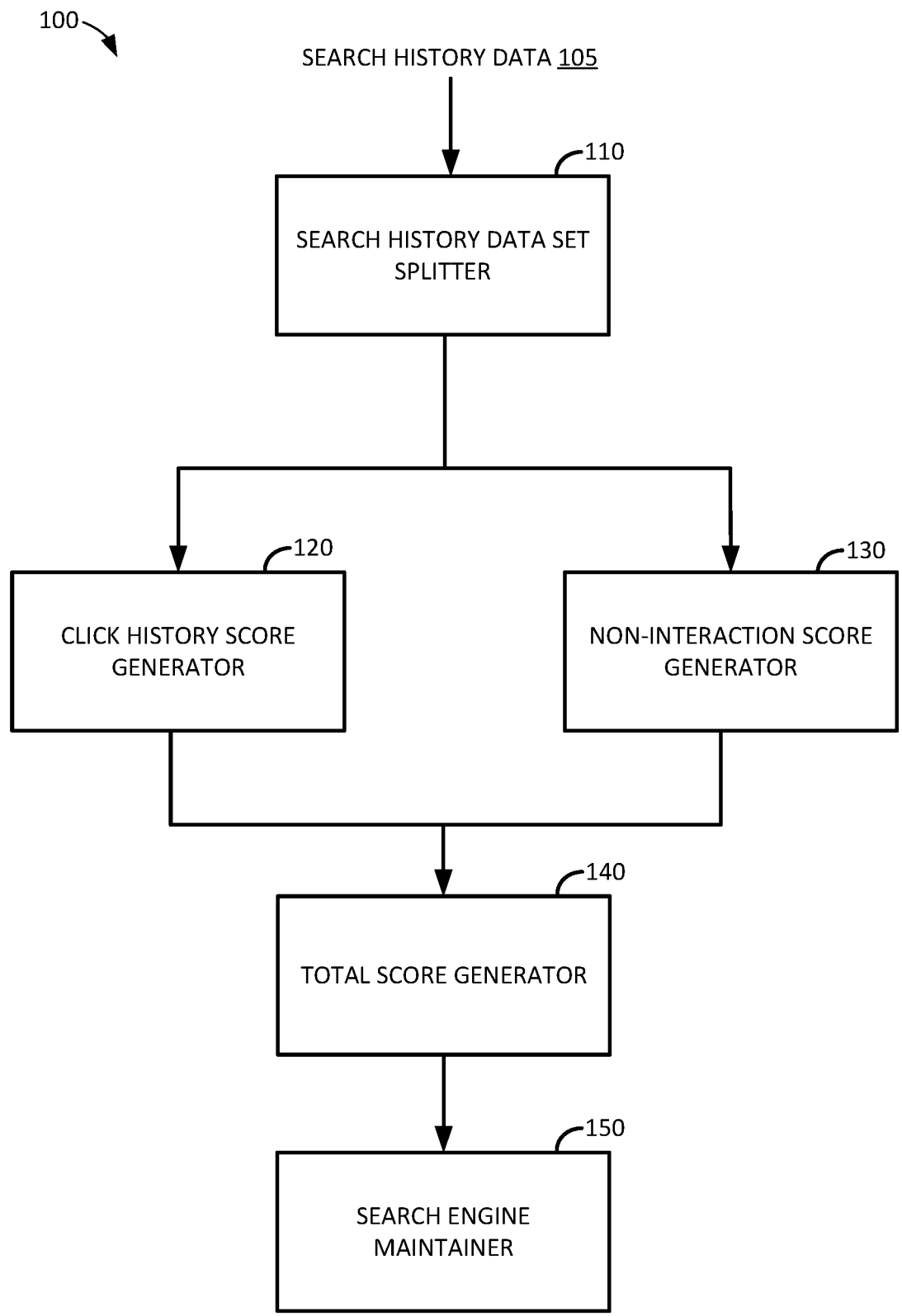
FIG. 1 illustrates an example pipeline for analyzing search engine performance based on relationships between consecutive queries, in accordance with aspects of the present disclosure.

Aspects of the present disclosure provide techniques for calculating the performance of search engines and adjusting the performance of search engines based on the calculated performance.

To evaluate the performance of a search engine, various techniques can be used to monitor which search results (if any) a user interacts with and calculate the effectiveness of the search engine based on the search results that the user interacts with. These metrics may include statistical measures such as mean reciprocal rank (e.g., the inverse of the rank of the first search result selected by a user), a mean average precision (e.g., an average rank of the search results selected by a user), or the like. Generally, a search resulting in a user selecting no answer may be treated as a failed search and assigned a value of 0 (or some other value indicating that the search was unsuccessful), and a search resulting in a user selecting at least one result may be treated as a successful search and assigned a non-zero value.

However, scenarios may exist in which a search is successful even if the user does not interact with any results of the search query. For example, some search engines may provide a preview of the search results generated for a search query. This preview may include, for example, a snippet or portion of relevant text including the words or phrases included in the search query, a thumbnail image providing a preview of a result, or the like. In some cases, this preview may provide sufficient information for the user to constitute a successful search. However, because the user did not interact with any search result (or at least did not record interaction with a search result, such as clicking on a link or otherwise viewing content), the search may be considered a failed search in evaluating the quality of the results provided by a search engine. Further, because each search may be treated as an individual event, and because relationships between consecutive events may be disregarded in many cases, evaluation systems may not accurately classify whether non-interaction with a search result corresponds to a failed search or a successful search.

To improve the accuracy of the evaluation of search result quality, aspects of the present disclosure provide techniques for calculating the performance of search engines that consider relationships between successive searches to determine whether a search was a successful search or an unsuccessful search. In doing so, aspects of the present disclosure may determine whether a search for which there was no interaction was actually a successful search based on contextual similarity between consecutive searches. Generally, it may be inferred that a search was successful (e.g., delivered relevant content to the user) if, despite there being no user interaction with a search result, a user subsequently performs a search for a different topic. By doing so, aspects of present disclosure may provide techniques that more accurately reflect the accuracy of results provided by a search engine. Because these accuracy metrics may be used to trigger various computational operations for modifying how a search engine searches for data in response to a search engine (e.g., through re-training a machine learning model, re-indexing data, etc.), improving the accuracy of these accuracy metrics may reduce the likelihood that such computationally expensive operations may be performed when users do not interact with search results that do, in fact, provide relevant data to the user. That is, while accuracy metrics that disregard contextual relationships between consecutive searches may inaccurately deem some searches to be unsuccessful and thus needlessly cause a search engine to perform various operations to modify how the search engine searches for data, accuracy metrics that do consider contextual relationships between consecutive searches may more accurately reflect the quality of a search engine and reduce the likelihood that unnecessary operations to modify models or indices used by a search engine are performed. Thus, aspects of the present disclosure may reduce the amount of processing time, processor resources, memory, and other compute resources used in maintaining models, indexes, and other constructs used by search engines to deliver search results to users of the search engine.

Example Search Engine Performance Analysis Pipeline

FIG. 1 illustrates an example pipeline 100 for analyzing search engine performance based on relationships between consecutive queries, in accordance with aspects of the present disclosure.

As illustrated, pipeline 100 begins with receiving search history data 105 for analysis. The search history data 105 generally includes a plurality of search queries and associated interaction with the results generated for each search query. Each search query may include a text string corresponding to user input (e.g., through text entry, recorded utterances transcribed to text, etc.) and a timestamp at which the search query is performed. Interaction with the results generated for each search query may include information specifying which results, if any, a user clicked on or other otherwise interacted with in viewing the results of the search engine. A null set may specify that the user clicked on or otherwise interacted with none of the search results generated by the search engine. If a user interacted with any search result generated by the search engine, the associated interaction data for a search query may include indices of each result with which the user interacted. The associated interaction data may include, for example, a set of indices, a one-hot vector with values of "1" associated with results for which user interaction was recorded and "0" associated with results for which user interaction was not recorded, and the like.

Search history data set splitter 110 generally receives the search history data 105 and splits the search history data 105 into two data sets. A first data set is associated with searches for which user interaction with one or more search results was recorded, and a second data set is associated with searches for which user interaction with search results was not recorded. Generally, the first data set may be provided to click history score generator 120 for analysis of the searches for which user interaction was recorded, and the second data set may be provided to non-interaction score generator 130 for analysis of the searches for which user interaction was not recorded.

Click history score generator 120 generally calculates a score for each search query in the first set of search history data based on the indices of the results with which a user interacted. In some aspects, the score calculated for each search query by click history score generator 120 may include a mean reciprocal rank (MRR) score calculated based on the indices of each search result with which a user interacted. This MRR score may be calculated based on the inverse of the rank of each search result, such that interaction with the first search result is assigned a score of 1, interaction with the second search result is assigned a score of ½, interaction with the third search result is assigned a score of ⅓, and so on. For example, assume that three results were returned, and the user interacted with search results with indices 1 and 3. The resulting MRR calculation may be represented by the following:

$$\frac{\frac{1}{1}+\frac{1}{3}+0}{3} = \frac{4}{9}$$

In this example, a value of 0 represents a non-interaction event with respect to a given search result. Because, in some aspects, a large number of search results may be generated, non-interaction with search results may be inferred from the exclusion of search results in the set of indices associated with results with which a user interacted.

Non-interaction score generator 130 may operate in parallel or substantially in parallel with click history score generator 120 to calculate a score for each search query in the second set of search history data. Because the second set of search history data generally includes searches for which user interaction with search results was not recorded, contextual clues can be leveraged to determine, or at least predict, whether a search query successfully delivered the desired information to the user (e.g., in a preview of search results output to the user by a search engine).

To calculate a score for a search query in the second set of search history data, non-interaction score generator 130 can pre-process each search query so that each search query is associated with a meaningful set of words. To do so, non-interaction score generator 130 can apply various natural language processing (NLP) cleaning techniques to remove words that are likely to be unimportant to the contextual information included in a search. These words may be known as "stop words" and include words like conjunctions, articles, and the like. After cleaning each query in the second set of search history data, non-interaction score generator can apply various expansion rules to ensure consistency across different search queries. For example, these expansion rules may replace a priori defined acronyms with the fully expanded string associated with these acronyms (e.g., replacing "BPP" with "batch processing platform"), replace a priori defined slang or alternative words with a canonical word for a given concept (e.g., replace "dogfooding" with "testing"), or the like.

After pre-processing the search queries in the second set of search history data, non-interaction score generator 130 can calculate a score for each search query in the second set of search history data based on contextual clues associated with a search query and other temporally related search queries. To do so, temporally related groups of search queries may be generated for each search query in the second set of search history data. A temporally related search group may be, for example, the set of search queries executed for a user within a threshold amount of time from a search query for which user interaction was not recorded. This threshold amount of time may be defined a priori or may be customized based on the length of time over which search query data should be analyzed, with larger amounts of time capturing additional information with a corresponding increase in computational expense.

Within a temporally related search group, each successive pair of queries may be grouped together so that an NLP model can model semantic relationships between successive queries. For example, assume that a temporally related search group includes searches using the queries "espp", "company stock" and "holiday". The temporally related search group may thus generate two query pairings: a first pairing of ("espp", "company stock"), and a second pairing of ("company stock", "holiday"). Each query in a pairing may be mapped to an embedding representation of the query pairing using various NLP techniques. For example, an NLP model may extract semantic relationships beyond syntactical relationships for a query to generate the embedding representation, which may be a mapping of each query in a pair of queries to a multidimensional space. Based on a similarity metric calculated for each query in the pair of queries, non-interaction score generator 130 can determine whether successive queries were queries having a same intent or queries having a different intent. This similarity metric may include, for example, a cosine similarity score calculated between the embedding representations generated for each query within the temporally related search group or other similarity scores that may be calculated between different vectors, or embedding representations, generated for queries in the temporally related search group.

In some examples, the NLP model may be an encoder that generates similarity scores between different queries, such as the Google Universal Encoder model. Generally, higher similarity scores may indicate that two queries are related to each other and are thus likely to correspond to a same search intent. Meanwhile, lower similarity scores may indicate that two queries are less strongly related to each other, or not related to each other at all, and are thus likely to correspond to different search intents. To determine whether consecutive search queries are for the same or different intents, a threshold similarity score may be defined. This threshold score may be defined a priori to provide a desired level of precision and recall Similarity scores between consecutive queries that are above the threshold may be associated with queries having the same intent (and thus, queries for which a first search may not have successfully delivered the desired information to the user), while similarity scores between consecutive queries that are below the threshold may be associated with queries having different intents (and thus, an inference that the first query delivered the desired information to the user).

Based on the similarity scores generated for each pair of consecutive queries in the temporally related group of queries, the temporally related group of queries can be divided into a total number of groups with different intents. A score may be generated based on the number of successful search events for search queries that are not associated with user interaction, a confidence score, and an average click rank for results generated over a temporal window. The number of successful search events for search queries that are not associated with user interaction may, for example, be determined based on identifying non-interaction with a first search query with a first intent and execution of a second search query with a second, different, intent. Returning to the example of the set of queries including "espp", "company stock", and "holiday", a successful search without user interaction may include a search for "company stock" not associated with user interaction with a search result, followed by a search for "holiday". Because "espp" and "company stock" may be closely related terms, non-interaction with search results generated for "espp", followed by a search for "company stock", may result in the "espp" query being counted as an unsuccessful search without user interaction. However, because "company stock" and "holiday" may be unrelated terms (and thus have a large distance between embedding vectors), non-interaction with search results generated for the "company stock" query, followed by a search for "holiday", may result in the "company stock" query being counted as a successful search despite non-interaction with search results generated for this query.

Total score generator 140 generally aggregates the score generated by click history score generator 120 for searches associated with user interaction events and the score generated by non-interaction score generator 130 for searches that are not associated with user interaction events into a total score for the search engine. This total score may generally reflect the quality or efficacy of a search engine in delivering search results to a user of a search engine. This total score may be output to search engine maintainer 150, which can use the score to determine whether maintenance operations are to be performed on the search engine and, in some embodiments, perform such maintenance operations. For example, if the total score is less than a defined threshold, search engine maintainer 150 can trigger various operations to adjust how the search engine generates results for user queries. These operations may include, for example, re-indexing search results, re-training a machine learning model based on search query history data to improve the quality of predictions made by the machine learning model of relevant content for a user, and/or the like.

Example Computer-Implemented Method for Analyzing Search Engine Performance

Figure 2:
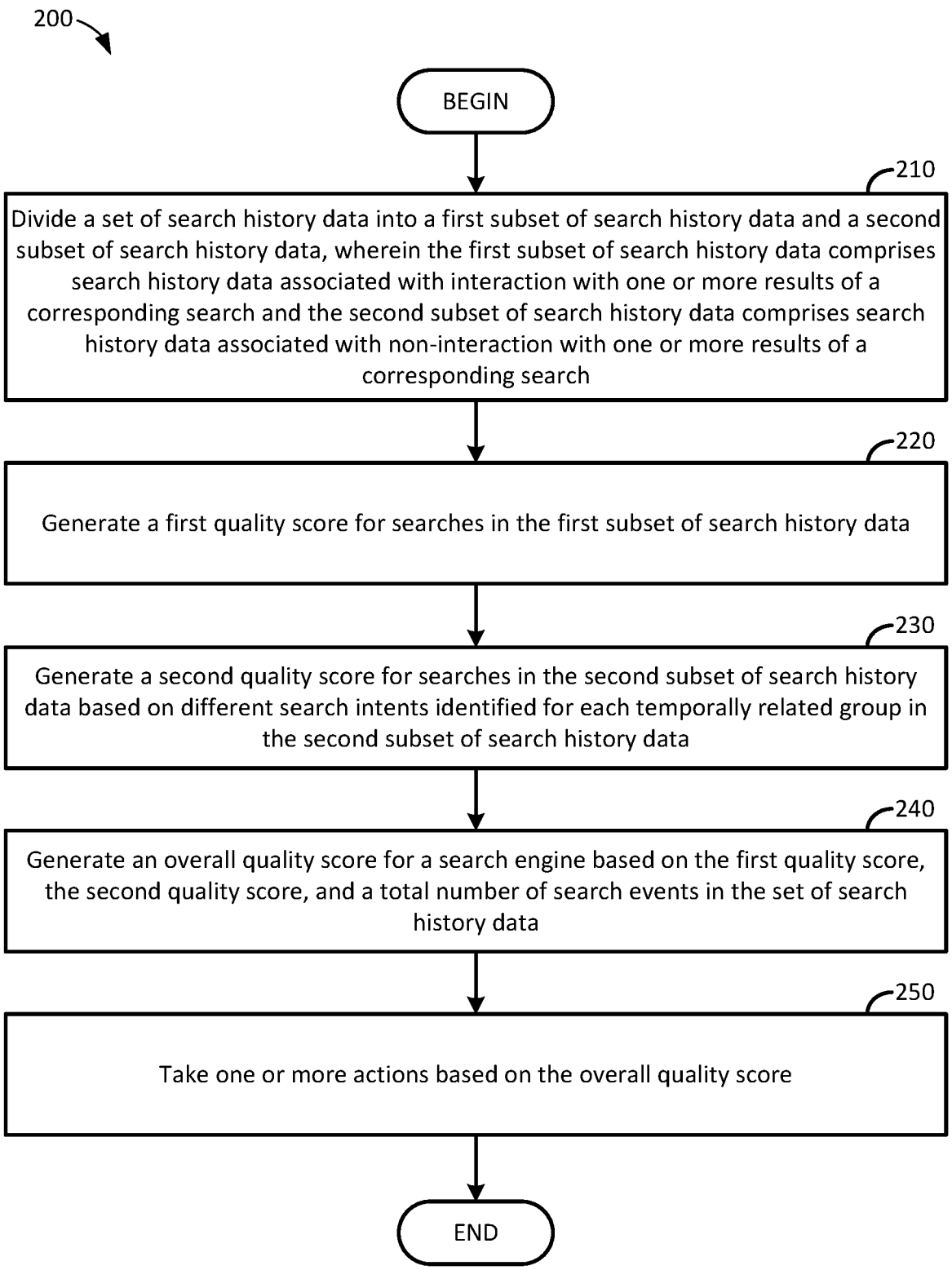
FIG. 2 illustrates example operations that may be performed by a computing system to determine the performance of a search engine based on relationships between consecutive queries and adjust the search engine based on the determined performance, in accordance with aspects of the present disclosure.

FIG. 2 illustrates example operations 200 for analyzing search engine performance based on relationships between consecutive queries, according to aspects of the present disclosure. Operations 200 may be performed by a search engine analysis system, such as a server computer, a cluster of computing devices, or the like, which can host a search engine and analyze analytics data from the search engine, such as a system implementing pipeline 100 illustrated in FIG. 1.

As illustrated, operations 200 begin at block 210, with dividing a set of search history data into a first subset of search history data and a second subset of search history data. Generally, the first subset of search history data includes search history data associated with interaction with one or more results of a corresponding search. The second subset of search history generally includes search history data associated with non-interaction with one or more results of a corresponding search. Generally, interaction with one or more results of a corresponding search may include a user clicking on a search result, previewing the search result for more than a threshold amount of time (e.g., such that imagery associated with the result is loaded and displayed to a user, such that playback of a video associated with the result is initiated, or the like). Non-interaction with one or more results of a corresponding search may be represented as a null set of interaction data associated with a search result and may be followed by another search query which may or may not be associated with user interaction with the results.

At block 220, operations 200 proceed with generating a first quality score for searches in the first subset of search history data. In some aspects, the first quality score may be a mean reciprocal rank (MRR) score calculated for the searches in the first subset of search history data. Generally, the first quality score may take into account the rankings of the search results for which user interaction was recorded, with higher scores being associated with search results that are higher in rank and lower scores being associated with search results that are lower in rank.

At block 230, operations 200 proceed with generating a second quality score for searches in the second subset of search history data based on different search intents identified for each temporally related group in the second subset of search data. In some aspects, the one or more temporally related groups may be generated as groups of search events occurring within a threshold amount of time at which an initial search event associated with non-interaction with one or more results of the initial search event was performed.

At block 240, operations 200 proceed with generating an overall quality score for a search engine based on the first quality score, the second quality score, and a total number of search events in the set of search history data. For example, the overall quality score may be calculated as the sum of the first quality score and the second quality score, divided by the total number of search events in the set of search history data.

At block 250, operations 200 proceed with taking one or more actions with respect to the search engine based on the overall quality score. As discussed, when the overall quality score indicates that users are not obtaining relevant search results for a number of topics, this information can be used to trigger various processes for re-indexing data or re-training machine learning models used by the search engine to deliver relevant search results for a received query.

Figure 3:
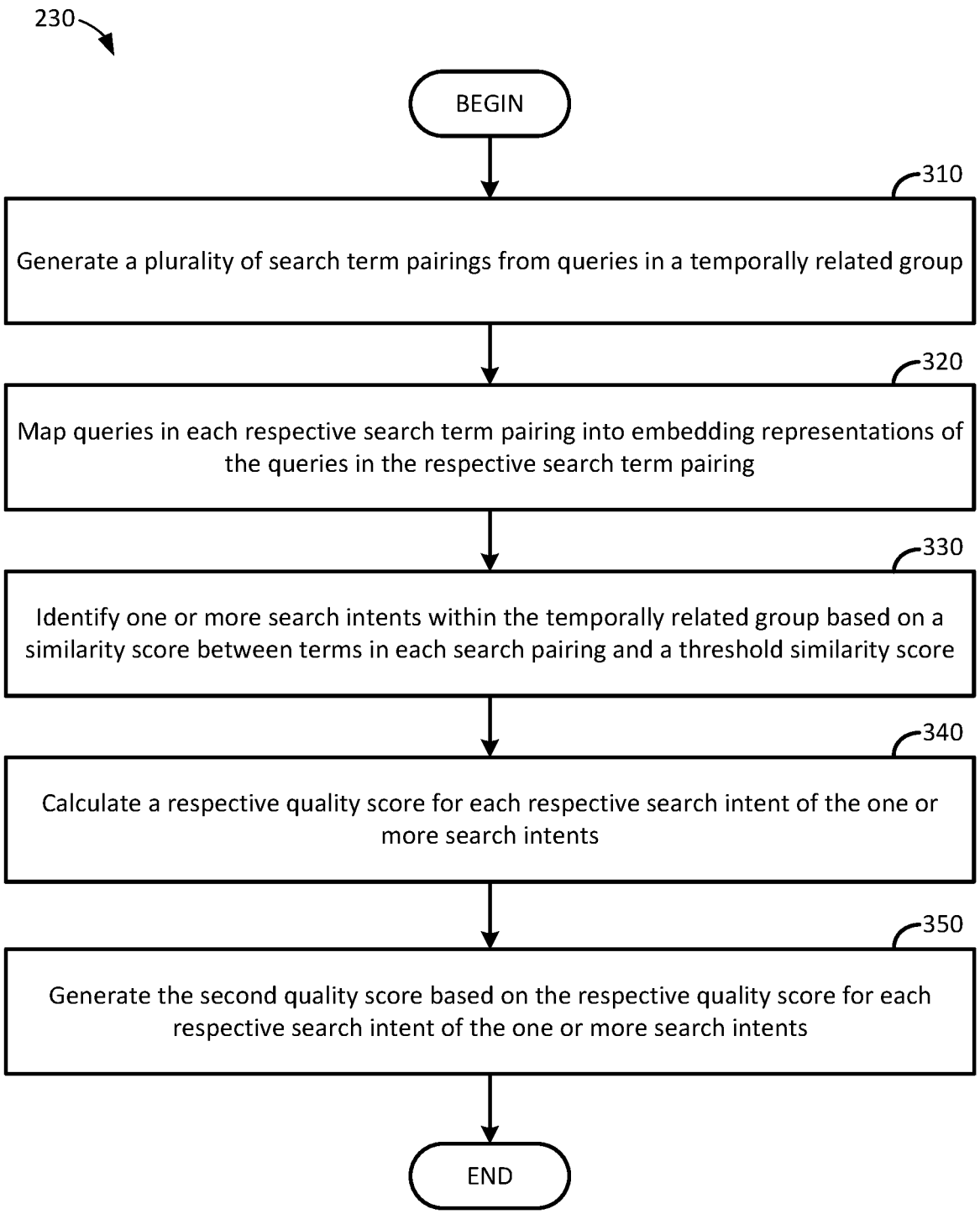
FIG. 3 illustrates further details of calculating the performance of a search engine based on relationships between consecutive queries and user activity information associated with these consecutive queries, in accordance with aspects of the present disclosure.

FIG. 3 illustrates further details of calculating the performance of a search engine based on relationships between consecutive queries and user activity information associated with these consecutive queries discussed with respect to block 230 illustrated in FIG. 2 above.

As illustrated, operations 230 begins at block 310 with generating a plurality of search term pairings from queries in a temporally related group. As discussed, a search term pairing may include search queries that are performed consecutively within the temporally related group. For example, given a temporally related group defined as the set of consecutive search queries {"A", "B", "C", "D", "E"}, the plurality of search pairings may be defined as ("A", "B"), ("B", "C"), ("C" "D"), and ("D", "E").

At block 320, operations 230 proceed with mapping queries in each respective search term pairing into embedding representations of the queries. In some aspects, the embedding representations may be a vector or other data in a multidimensional space representing a semantic meaning of the query from which a comparison can be made of whether consecutive queries are semantically related to each other. In some aspects, the embedding representations of the queries may be generated by a machine learning model trained to map a natural language input into a multidimensional space so that each natural language input is represented as a sequence of mathematically comparable numbers. The machine learning model may be, for example, a classifier model, an encoder from an encoder/decoder model (e.g., an encoder in a generative adversarial network, an autoencoder neural network, or the like), or other machine learning models that can be used to encode natural language inputs into a representation in an embedding space.

In some aspects, prior to mapping the queries in each respective search pairing into embedding representations of the queries, various cleaning operations can be performed on the queries. In some aspects, these cleaning operations may include removal of stop words, or words irrelevant to the intent or semantic meaning of a search, expansion of acronyms according to a priori defined rules, replacement of defined words with canonical words, and the like.

At block 330, operations 230 proceed with identifying one or more search intents within the temporally related group based on a similarity score between terms in each search pairing and a threshold similarity score. The similarity score may, in some aspects, be a cosine similarity score or other similarity score that can be calculated between vectors or other embedding representations generated by a machine learning model, as discussed above.

At block 340, operations 230 proceed with calculating a respective quality score for each respective search intent of the one or more search intents.

In some aspects, to calculate the respective quality score, a click rank score may be calculated for the respective search intent across search queries associated with the respective search intent. Interaction with a search result for a second query in a group of queries associated with the respective search intent also represents interaction with a search result for a first query in the group of queries. This respective quality score may be calculated based on an average click rank score calculated based on a rank of each search result with which a user interacts across search results associated with each search query in the temporally related group.

At block 350, operations 230 proceed with generating the second quality score based on the respective quality score for each respective search intent of the one or more search intents.

In some aspects, the quality score may be based on the number of search queries without associated interaction that are still deemed to be successful searches, the inverse of an average click rank calculated for each respective search intent, and an a priori defined weighting factor.

Example System for Analyzing Search Engine Performance

Figure 4:
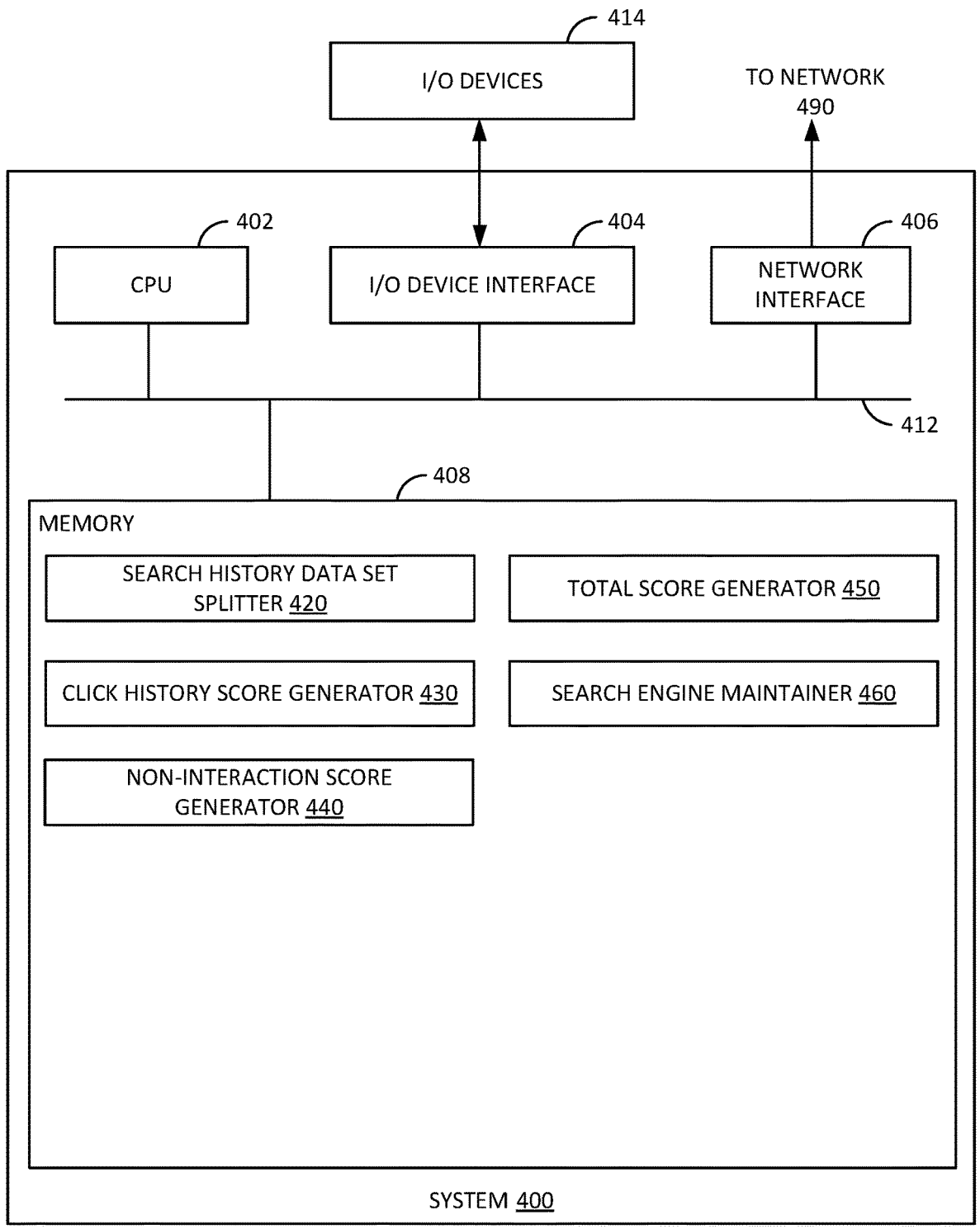
FIG. 4 illustrates a computing system on which aspects of the present disclosure may be performed.

FIG. 4 illustrates an example system 400 that analyzes search engine performance based on relationships between consecutive queries. In one example, system 400 may comprise a computing system on which pipeline 100 illustrated in FIG. 1 may be executed.

As shown, system 400 includes a central processing unit (CPU) 402, one or more I/O device interfaces 404 that may allow for the connection of various I/O devices 414 (e.g., keyboards, displays, mouse devices, pen input, etc.) to the system 400, network interface 406 through which system 400 is connected to network 490 (which may be a local network, an intranet, the internet, or any other group of computing devices communicatively connected to each other), a memory 408, and an interconnect 412.

CPU 402 may retrieve and execute programming instructions stored in the memory 408 Similarly, the CPU 402 may retrieve and store application data residing in the memory 408. The interconnect 412 transmits programming instructions and application data, among the CPU 402, I/O device interface 404, network interface 406, and memory 408. CPU 402 is included to be representative of a single CPU, multiple CPUs, a single CPU having multiple processing cores, and the like.

Memory 408 is representative of a volatile memory, such as a random access memory, or a nonvolatile memory, such as nonvolatile random access memory, phase change random access memory, or the like. As shown, memory 408 includes a search history data set splitter 420, click history score generator 430, non-interaction score generator 440, total score generator 450, and search engine maintainer 460.

Search history data set splitter 420 generally corresponds to search history data set splitter 110 illustrated in FIG. 1. Generally, search history data set splitter 420 receives a user search history data set including queries executed through a search history by a given user. This search history data set generally associates each query, which may be an input text string typed into a search engine by a user, an input text string generated from a received vocal utterance provided to a search engine, or the like, with a set of search results with which a user interacted and a timestamp associated with the query. The set of search results may be a null set, indicating that a user did not interact with any search results generated for the query, or a non-null set, indicating that the user interacted with at least one result generated for the query. The set of search results may be divided into a first set of search queries, corresponding to searches for which there is associated user interaction, and a second set of search queries, corresponding to searches for which there is no associated user interaction.

Click history score generator 430 generally corresponds to click history score generator 120 illustrated in FIG. 1. Generally, click history score generator 430 calculates a score for queries associated with user interaction (e.g., the first set of search queries) based on the rank of the results with which user interaction was recorded. This score may be, for example, an MRR score calculated for each query with which user interaction was recorded. The MRR score for each query may be aggregated into a total score for searches for which user interaction was recorded.

Non-interaction score generator 440 generally corresponds to non-interaction score generator 130 illustrated in FIG. 1. Generally, non-interaction score generator 440 divides a set of search queries for which no user interaction is recorded into groups of temporally related searches (e.g., groups of searches executed within a defined time window from a first search for which user interaction was not recorded) and attempts to identify a set of semantically related searches using natural language processing techniques (e.g., encoding queries into embedding vectors and using various distance metrics to identify queries with different search intents). Scores can be generated for each set of semantically related searches, based on an assumption that consecutive searches with same intents represent unsuccessful searches, while consecutive searches with different intents may indicate that a search successfully provided a user with the desired information.

Total score generator 450 generally corresponds to total score generator 140 illustrated in FIG. 1. Generally, total score generator 450 aggregates the scores generated by click history score generator 430 and non-interaction score generator 440 into a total score representing the performance of a search engine. The total score may be provided to search engine maintainer 460, corresponding to search engine maintainer 150 illustrated in FIG. 1, which uses the total score to determine whether a search engine is performing as desired (e.g., whether a search engine is providing results that are useful to a user) and triggers various maintenance procedures (e.g., re-indexing, re-training of machine learning models, etc.) when the total score indicates that a search engine is not providing results that are useful to users of the search engine.

Example Clauses

Implementation details of various aspects of the present disclosure are described in the following numbered clauses.

Clause 1: A method, comprising: dividing a set of search history data into a first subset of search history data and a second subset of search history data, wherein the first subset of search history data comprises search history data associated with interaction with one or more results of a first corresponding search and the second subset of search history data comprises search history data associated with non-interaction with one or more results of a second corresponding search; generating a first quality score for searches in the first subset of search history data; generating a second quality score for searches in the second subset of search history data based on different search intents identified for each temporally related group in the second subset of search history data; generating an overall quality score for a search engine based on the first quality score, the second quality score, and a total number of search events in the set of search history data; and taking one or more actions based on the overall quality score.

Clause 2: The method of Clause 1, wherein the one or more temporally related groups comprise groups of search events occurring within a threshold amount of time after an initial search event associated with non-interaction with one or more results of the initial search event was performed.

Clause 3: The method of any one of Clauses 1 or 2, wherein generating the second quality score for searches in the second subset of search history data comprises, for each temporally related group: generating a plurality of search term pairings, each respective search term pairing corresponding to consecutive queries input into the search engine; mapping queries in each respective search term pairing of the plurality of search term pairings into embedding representations of the queries; identifying one or more search intents within the temporally related group based on a similarity score between the queries in each respective search term pairing and a threshold similarity score; calculating a respective quality score for each respective search intent of the one or more search intents; and generating the second quality score based on the respective quality score for each respective search intent of the one or more search intents.

Clause 4: The method of Clause 3, wherein the similarity score comprises a cosine similarity score.

Clause 5: The method of Clause 4, wherein the cosine similarity score comprises a score generated by a machine learning model trained to generate the similarity score based on a semantic similarity between the queries in each search pairing.

Clause 6: The method of any one of Clauses 3 through 5, wherein calculating the respective quality score for each respective search intent comprises calculating a click rank score for the respective search intent across queries associated with the respective search intent such that interaction with a search result for a second query in a group of queries associated with the respective search intent also represents interaction with a search result for a first query in the group of queries.

Clause 7: The method of Clause 6, wherein the respective quality score is calculated based on an average click rank score calculated based on a rank of each search result with which a user interacts across search results associated with each search query in the temporally related group.

Clause 8: The method of any one of Clauses 1 through 7, wherein the first quality score comprises a mean reciprocal rank score calculated for searches in the first subset of search history data.

Clause 9: The method of any one of Clauses 1 through 8, wherein generating the overall quality score for the search engine comprises a sum of the first quality score and the second quality score, divided by the total number of search events in the set of search history data.

Clause 10: The method of any one of Clauses 1 through 9, wherein the one or more actions comprises triggering re-training of one or more machine learning models used by the search engine to deliver relevant data in response to a received query.

Clause 11: An apparatus comprising: a memory having executable instructions stored thereon; and a processor configured to execute the executable instructions to cause the apparatus to perform the operations of any one of Clauses 1 through 10.

Clause 12: An apparatus comprising: means for performing the operations of any one of Clauses 1 through 10.

Clause 13: A computer-readable medium having instructions stored thereon which, when executed by a processor, performs the operations of any one of Clauses 1 through 10.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
dividing a set of search history data into a first subset of search history data and a second subset of search history data, wherein the first subset of search history data is associated with interaction with one or more results of a first corresponding search and the second subset of search history data is associated with one or more results of a second corresponding search that remained unselected by respective users;
generating a first quality score for searches in the first subset of search history data;
generating a second quality score for searches in the second subset of search history data based on search intents identified in the second subset of search history data;
generating an overall quality score for a search engine based on the first quality score and the second quality score; and
taking one or more actions based on the overall quality score.

2. The method of claim 1, wherein the second subset of search history data comprises one or more groups of search events occurring within a threshold amount of time after occurrence of an initial search event.

3. The method of claim 2, wherein generating the second quality score for searches in the second subset of search history data comprises, for each group of the one or more groups:
generating a plurality of search term pairings, each respective search term pairing corresponding to consecutive queries input into the search engine;
mapping queries in each respective search term pairing of the plurality of search term pairings into embedding representations of the queries;
identifying one or more search intents within the group based on a similarity score between the queries in each respective search term pairing and a threshold similarity score;
calculating a respective quality score for each respective search intent of the one or more search intents; and
generating the second quality score based on the respective quality score for each respective search intent of the one or more search intents.

4. The method of claim 3, wherein the similarity score comprises a cosine similarity score.

5. The method of claim 4, wherein the cosine similarity score comprises a score generated by a machine learning model trained to generate the similarity score based on a semantic similarity between the queries in each search pairing.

6. The method of claim 3, wherein calculating the respective quality score for each respective search intent comprises calculating a click rank score for the respective search intent across queries associated with the respective search intent such that interaction with a search result for a second query in a group of queries associated with the respective search intent also represents interaction with a search result for a first query in the group of queries.

7. The method of claim 6, wherein the respective quality score is calculated based on an average click rank score calculated based on a rank of each search result with which a user interacts across search results associated with each search query in the group.

8. The method of claim 1, wherein the first quality score comprises a mean reciprocal rank score calculated for searches in the first subset of search history data.

9. The method of claim 1, wherein the overall quality score for the search engine is based on a sum of the first quality score and the second quality score.

10. The method of claim 1, wherein the one or more actions comprise triggering re-training of one or more machine learning models used by the search engine to deliver relevant data in response to a received query.

11. A system, comprising:
one or more processors; and
a memory comprising instructions that, when executed by the one or more processors, cause the system to:
divide a set of search history data into a first subset of search history data and a second subset of search history data, wherein the first subset of search history data is associated with interaction with one or more results of a first corresponding search and the second subset of search history data is associated with one or more results of a second corresponding search that remained unselected by respective users;
generate a first quality score for searches in the first subset of search history data;
generate a second quality score for searches in the second subset of search history data based on search intents identified in the second subset of search history data;
generate an overall quality score for a search engine based on the first quality score and the second quality score; and
take one or more actions based on the overall quality score.

12. The system of claim 11, wherein the second subset of search history data comprises one or more groups of search events occurring within a threshold amount of time after occurrence of an initial search event.

13. The system of claim 12, wherein generating the second quality score for searches in the second subset of search history data comprises, for each group of the one or more groups:
generating a plurality of search term pairings, each respective search term pairing corresponding to consecutive queries input into the search engine;
mapping queries in each respective search term pairing of the plurality of search term pairings into embedding representations of the queries;
identifying one or more search intents within the group based on a similarity score between the queries in each respective search term pairing and a threshold similarity score;
calculating a respective quality score for each respective search intent of the one or more search intents; and
generating the second quality score based on the respective quality score for each respective search intent of the one or more search intents.

14. The system of claim 13, wherein the similarity score comprises a cosine similarity score.

15. The system of claim 14, wherein the cosine similarity score comprises a score generated by a machine learning model trained to generate the similarity score based on a semantic similarity between the queries in each search pairing.

16. The system of claim 14, wherein calculating the respective quality score for each respective search intent comprises calculating a click rank score for the respective search intent across queries associated with the respective search intent such that interaction with a search result for a second query in a group of queries associated with the respective search intent also represents interaction with a search result for a first query in the group of queries.

17. The system of claim 16, wherein the respective quality score is calculated based on an average click rank score calculated based on a rank of each search result with which a user interacts across search results associated with each search query in the group.

18. The system of claim 11, wherein the first quality score comprises a mean reciprocal rank score calculated for searches in the first subset of search history data.

19. The system of claim 11, wherein the overall quality score for the search engine is based on a sum of the first quality score and the second quality score.

20. A non-transitory computer readable medium comprising instructions that, when executed by one or more processors of a computing system, cause the computing system to:
divide a set of search history data into a first subset of search history data and a second subset of search history data, wherein the first subset of search history data is associated with interaction with one or more results of a first corresponding search and the second subset of search history data is associated with one or more results of a second corresponding search that remained unselected by respective users;

generate a first quality score for searches in the first subset of search history data;
generate a second quality score for searches in the second subset of search history data based on search intents identified in the second subset of search history data;
generate an overall quality score for a search engine based on the first quality score and the second quality score; and
take one or more actions based on the overall quality score.

\* \* \* \* \*